(12) United States Patent
Shen et al.

(10) Patent No.: US 7,743,232 B2
(45) Date of Patent: Jun. 22, 2010

(54) MULTIPLE-CORE PROCESSOR WITH HIERARCHICAL MICROCODE STORE

(75) Inventors: Gene W. Shen, San Jose, CA (US);
Bruce R. Holloway, Boulder Creek, CA (US); Sean Lie, Santa Clara, CA (US);
Michael G. Butler, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 340 days.

(21) Appl. No.: 11/779,642

(22) Filed: Jul. 18, 2007

(65) Prior Publication Data
US 2009/0024836 A1    Jan. 22, 2009

(51) Int. Cl.
*G06F 9/24* (2006.01)
(52) U.S. Cl. ........................................ 712/211
(58) Field of Classification Search .................. None
See application file for complete search history.

(56) References Cited

U.S. PATENT DOCUMENTS

| | | | |
|---|---|---|---|
| 4,021,779 A | | 5/1977 | Gardner |
| 4,455,604 A | | 6/1984 | Ahlstrom et al. |
| 4,498,132 A | | 2/1985 | Ahlstrom et al. |
| 4,642,757 A | | 2/1987 | Sakamoto |
| 4,901,235 A | | 2/1990 | Vora et al. |
| 5,036,453 A | * | 7/1991 | Renner et al. ............... 712/16 |
| 5,574,927 A | * | 11/1996 | Scantlin ..................... 712/41 |
| 5,649,112 A | | 7/1997 | Yeager et al. |
| 5,671,356 A | | 9/1997 | Wang |

(Continued)

FOREIGN PATENT DOCUMENTS

| EP | 0098494 A | 1/1984 |
|---|---|---|
| EP | 0178671 A | 4/1986 |

OTHER PUBLICATIONS

International Search Report and Written Opinion mailed Oct. 6, 2008 for International Application No. PCT/US2008/08802 filed Jul. 18, 2008.

(Continued)

*Primary Examiner*—Eddie P Chan
*Assistant Examiner*—Robert Fennema
(74) *Attorney, Agent, or Firm*—Meyertons, Hood, Kivlin, Kowert & Goetzel, P.C.; Anthony M. Petro (57) ABSTRACT

A multiple-core processor having a hierarchical microcode store. A processor may include multiple processor cores, each configured to independently execute instructions defined according to a programmer-visible instruction set architecture (ISA). Each core may include a respective local microcode unit configured to store microcode entries. The processor may also include a remote microcode unit accessible by each of the processor cores. Any given one of the processor cores may be configured to generate a given microcode entry-point corresponding to a particular microcode entry including one or more operations to be executed by the given processor core, and to determine whether the particular microcode entry is stored within the respective local microcode unit of the given core. In response to determining that the particular microcode entry is not stored within the respective local microcode unit, the given core may convey a request for the particular microcode entry to the remote microcode unit.

20 Claims, 6 Drawing Sheets

U.S. PATENT DOCUMENTS

| | | | |
|---|---|---|---|
| 5,796,972 A | 8/1998 | Johnson et al. | |
| 5,845,102 A * | 12/1998 | Miller et al. | 712/211 |
| 6,141,740 A | 10/2000 | Mahalingaiah et al. | |
| 7,095,342 B1 | 8/2006 | Hum et al. | |
| 2007/0083735 A1 * | 4/2007 | Glew | 712/214 |

OTHER PUBLICATIONS

Rice, et al. "A formal model for SIMD computation" Frontiers of Massively Parallel Computation, 1998. Proceedings., 2nd Symposium on the Frontiers of Fairfax, VA, Oct. 10-12, 1998, Washington, DC., IEEE Comput. SOC. PR, US, Oct. 10, 1998, pp. 601-607.

* cited by examiner

| Entries 310 | |
|---|---|
| Operation fields 320 | Sequence control field 330 |
| Operation fields 320 | Sequence control field 330 |
| ⋮ | |
| Operation fields 320 | Sequence control field 330 |

Microcode control store 300

MULTIPLE-CORE PROCESSOR WITH HIERARCHICAL MICROCODE STORE

BACKGROUND OF THE INVENTION

1. Field of the Invention

This invention relates to processors, and, more particularly, to microcode implementation within processors including multiple processor cores.

2. Description of the Related Art

As processor implementation evolves, it is becoming increasingly common to attempt to increase processor performance by replicating individual processor cores within a processor. Such cores may be capable of independent instruction execution, increasing the coarse-grained parallelism available for application execution with less cost and design complexity than may be required by alternative strategies for increasing performance, such as increasing fine-grained parallelism or execution frequency.

Multiple-core processor implementations present certain design challenges of their own, however. Certain processor core resources, such as storage resources for microcode routines, may be included in critical timing paths such that proximity of the resource to a given core may directly affect the operating frequency of the given core. Sharing a single instance of such storage resources among multiple cores may thus degrade the performance of the cores by increasing the latency to the shared instance. However, replicating a storage resource such that each core includes its own instance of the resource may be costly in terms of design area, power and/or other design figures of merit.

SUMMARY

Various embodiments of a multiple-core processor having a hierarchical microcode store are disclosed. According to one embodiment, a processor may include a number of processor cores, each configured to independently execute instructions defined according to a programmer-visible instruction set architecture (ISA). Each of the processor cores may include a respective local microcode unit configured to store microcode entries. The processor may also include a remote microcode unit accessible by each of the processor cores and that includes a remote microcode store configured to store microcode entries. Any given one of the processor cores may be configured to generate a given microcode entry-point corresponding to a particular microcode entry including one or more operations to be executed by the given processor core, and to determine whether the particular microcode entry is stored within the respective local microcode unit of the given processor core. In response to determining that the particular microcode entry is not stored within the respective local microcode unit, the given core may convey a request for the particular microcode entry to the remote microcode unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Processor Core

Figure 1:
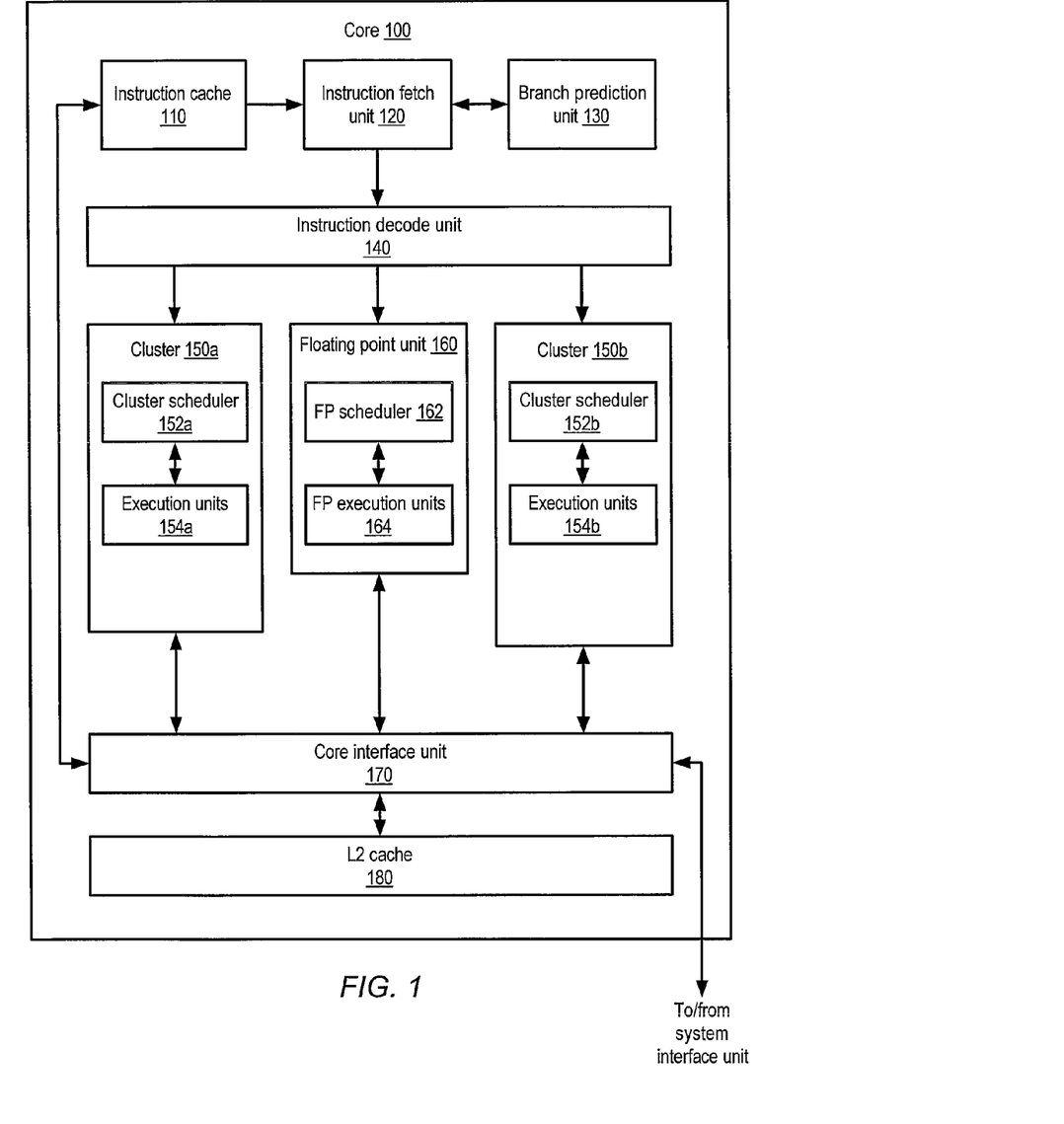
FIG. 1 is a block diagram illustrating one embodiment of a processor core.

One embodiment of a processor core 100 is illustrated in FIG. 1. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 110 coupled to provide instructions to an instruction fetch unit (IFU) 120. IFU 120 may be coupled to a branch prediction unit (BPU) 130 and to an instruction decode unit 140. Decode unit 140 may be coupled to provide operations to a plurality of integer execution clusters 150a-b as well as to a floating point unit (FPU) 160. Each of clusters 150a-b may include a respective cluster scheduler 152a-b coupled to a respective plurality of integer execution units 154a-b. In various embodiments, core 100 may include data caches (not shown) either within or shared by clusters 150a-b. In the illustrated embodiment, FPU 160 may be coupled to receive operations from FP scheduler 162. Clusters 150a-b, FPU 160 and instruction cache 110 may additionally be coupled to core interface unit 170, which may in turn be coupled to an L2 cache 180 as well as to a system interface unit (SIU) that is external to core 100 (shown in FIG. 2 and described below). It is noted that although FIG. 1 reflects certain instruction and data flow paths among various units, additional paths or directions for data or instruction flow not specifically shown in FIG. 1 may be provided. Additional configurations of core 100 are also possible, for example employing variations on numbers of clusters 150, FPUs 160, and instances of L2 cache 180, as well as variations on how such units may interact with one another.

As described in greater detail below, core 100 may be configured for multithreaded execution in which instructions from distinct threads of execution may concurrently execute. In various embodiments, it is contemplated that various numbers of threads may be supported for concurrent execution, and different numbers of clusters 150 and FPUs 160 may be provided. Additionally, other shared or multi-threaded units may also be added including specialized media processors or other types of accelerators.

Instruction cache 110 may be configured to store instructions prior to their being fetched, decoded and issued for execution. In various embodiments, instruction cache 110 may be configured as a direct-mapped, set-associative or fully-associative cache of any suitable size and/or degree of associativity. Instruction cache 110 may be physically addressed, virtually addressed or a combination of the two. In some embodiments, instruction cache 110 may also include translation lookaside buffer (TLB) logic configured to cache virtual-to-physical translations for instruction fetch addresses, although TLB and translation logic may be included elsewhere within core 100.

Instruction fetch accesses to instruction cache 110 may be coordinated by IFU 120. For example, IFU 120 may track the current program counter status for various executing threads and may issue fetches to instruction cache 110 in order to retrieve additional instructions for execution. In the case of an instruction cache miss, either instruction cache 110 or IFU 120 may coordinate the retrieval of instruction data from L2 cache 180. In some embodiments, IFU 120 may also coordinate prefetching of instructions from other levels of the memory hierarchy in advance of their expected use in order to mitigate the effects of memory latency. For example, successful instruction prefetching may increase the likelihood of instructions being present in instruction cache 110 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 130 may generally be configured to predict future fetch addresses for use by IFU 120. In some embodiments, BPU 130 may include any suitable structure(s) configured to store information about branch instructions. For example, in some embodiments BPU 130 may include one or more different types of predictors (e.g., local, global, or hybrid predictors) configured to predict the outcome of conditional branches.

As a result of fetching, IFU 120 may be configured to produce sequences of instruction bytes, which may also be referred to as fetch packets. A fetch packet may be any suitable number of bytes in length. In some embodiments, particularly for ISAs that implement variable-length instructions, there may exist variable numbers of valid instructions aligned on arbitrary boundaries within a given fetch packet, and in some instances instructions may span different fetch packets. Generally speaking decode unit 140 may be configured to identify instruction boundaries within fetch packets, to decode or otherwise transform instructions into operations suitable for execution by clusters 150 or FPU 160, and to dispatch such operations for execution.

In one embodiment, DEC 140 may be configured to first determine the length of possible instructions within a given window of bytes drawn from one or more fetch packets. For example, for an x86-compatible ISA, DEC 140 may be configured to identify valid sequences of prefix, opcode, "mod/rm" and "SIB" bytes, beginning at each byte position within the given fetch packet. Pick logic within DEC 140 may then be configured to identify, in one embodiment, the boundaries of multiple valid instructions within the window. In one embodiment, multiple fetch packets and multiple groups of instruction pointers identifying instruction boundaries may be queued within DEC 140.

Instructions may then be steered from fetch packet storage into one of several instruction decoders within DEC 140. In one embodiment, DEC 140 may be configured to provide as many independent instruction decoders as instructions to be dispatched per cycle for execution, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 150 or FPU 160. The resulting operations may also be referred to as micro-operations, micro-ops, or uops, and may be stored within one or more queues to await dispatch for execution. In some embodiments, microcode operations and non-microcode (or "fastpath") operations may be stored in separate queues. Further details regarding embodiments of microcode implementation within cores 100 are described in greater detail below.

Dispatch logic within DEC 140 may be configured to examine the state of queued operations awaiting dispatch in conjunction with the state of execution resources and dispatch rules in order to attempt to assemble dispatch parcels. For example, DEC 140 may take into account the availability of operations queued for dispatch, the number of operations queued and awaiting execution within clusters 150 and/or FPU 160, and any resource constraints that may apply to the operations to be dispatched. In one embodiment, DEC 140 may be configured to dispatch a parcel of operations to one of clusters 150 or FPU 160 during a given execution cycle.

In one embodiment, DEC 140 may be configured to decode and dispatch operations for only one thread during a given execution cycle. However, it is noted that IFU 120 and DEC 140 need not operate on the same thread concurrently. Various types of thread-switching policies are contemplated for use during instruction fetch and decode. For example, IFU 120 and DEC 140 may be configured to select a different thread for processing every N cycles (where N may be as few as 1) in a round-robin fashion. Alternatively, thread switching may be influenced by dynamic conditions that occur during operation.

Generally speaking, clusters 150 may be configured to implement integer arithmetic and logic operations as well as to perform load/store operations. In one embodiment, each of clusters 150*a-b* may be dedicated to the execution of operations for a respective thread. Each cluster 150 may include its own scheduler 152, which may be configured to manage the issue for execution of operations previously dispatched to the cluster. Each cluster 150 may further include its own copy of the integer physical register file as well as its own completion logic (e.g., a reorder buffer or other structure for managing operation completion and retirement).

Within each cluster 150, execution units 154 may support the concurrent execution of various different types of operations. For example, in one embodiment execution units 154 may support concurrent load/store address generation (AGU) operations and arithmetic/logic (ALU). Execution units 154 may support additional operations such as integer multiply and divide, although in various embodiments, clusters 150 may implement scheduling restrictions on the throughput and concurrency of such additional operations with other ALU/AGU operations. In various embodiments, clusters 150 may include or share data caches that may be organized differently from instruction cache 110.

FPU 160 may include FP scheduler 162 that, like cluster schedulers 152, may be configured to receive, queue and issue operations for execution within FP execution units 164. FPU 160 may also include a floating-point physical register file configured to manage floating-point operands. FP execution units 164 may be configured to implement various types of floating point operations, such as may be defined by the ISA. In various embodiments, FPU 160 may support the concurrent execution of certain different types of floating-point operations, and may also support different degrees of precision (e.g., 64-bit operands, 128-bit operands, etc.). In various embodiments, FPU 160 may include a data cache or may be configured to access data caches located in other units.

Instruction cache 110 and data caches 156 may be configured to access L2 cache 180 via core interface unit 170. In one embodiment, CIU 170 may provide a general interface between core 100 and other cores 100 within a system, as well as to external system memory, peripherals, etc. Typically, L2 cache 180 will be substantially larger in capacity than the first-level instruction and data caches.

In some embodiments, core 100 may support in-order operation. In other embodiments, core 100 may support out of order execution of operations, including load and store operations. That is, the order of execution of operations within clusters 150 and FPU 160 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 150 may be configured to execute conditional branch instructions and determine whether the branch outcome agrees with the predicted outcome. If not, clusters 150 may be configured to redirect IFU 120 to begin fetching along the correct path.

Separately, core 100 may implement various data speculation techniques that attempt to provide a data value for use in further execution before it is known whether the value is correct. By using such data speculatively, the timing constraints required to evaluate all conditions that bear on the validity of data prior to data use may be relaxed, enabling faster core operation.

Figure 2:
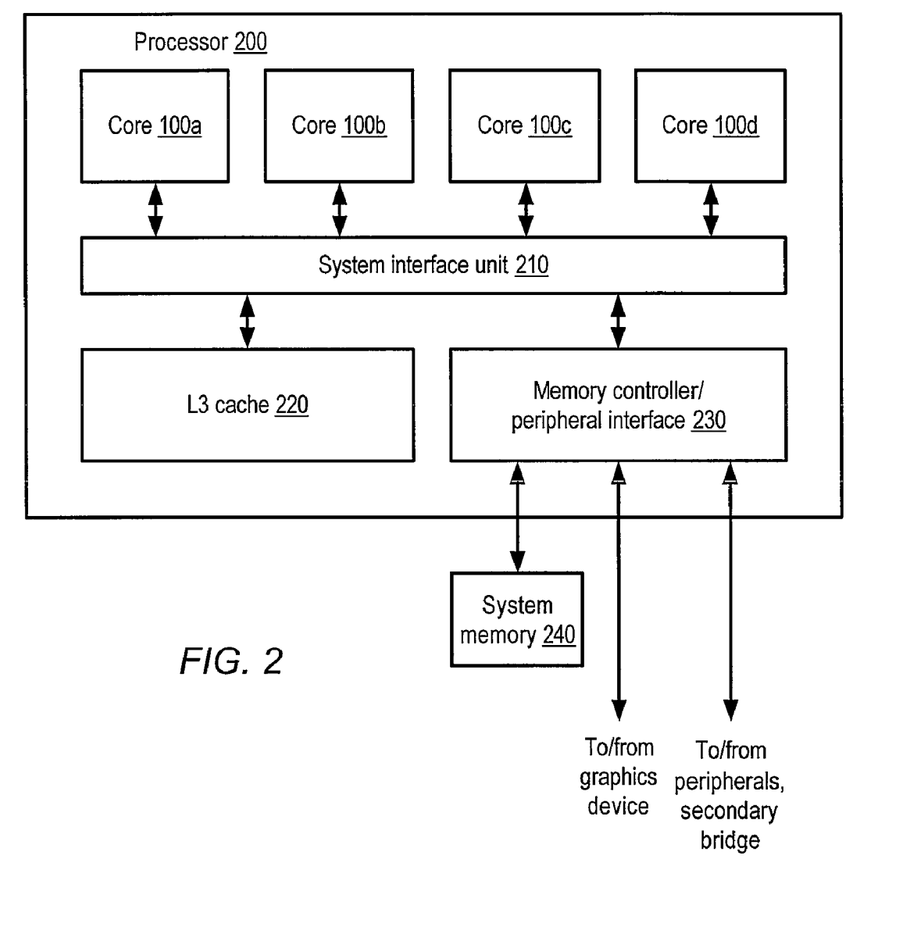
FIG. 2 is a block diagram illustrating one embodiment of a processor including multiple processor cores.

In various embodiments, a processor implementation may include multiple instances of core 100 fabricated as part of a single, monolithic integrated circuit chip along with other structures. One such embodiment of a processor is illustrated in FIG. 2. As shown, processor 200 includes four instances of core 100a-d, each of which may be configured as described above. In the illustrated embodiment, each of cores 100 may couple to an L3 cache 220 and a memory controller/peripheral interface unit (MCU) 230 via a system interface unit (SIU) 210. In one embodiment, L3 cache 220 may be configured as a unified cache, implemented using any suitable organization, that operates as an intermediate cache between L2 caches 180 of cores 100 and relatively slow system memory 240.

MCU 230 may be configured to interface processor 200 directly with system memory 240. For example, MCU 230 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 240. System memory 240 may be configured to store instructions and data that may be operated on by the various cores 100 of processor 200, and the contents of system memory 240 may be cached by various ones of the caches described above.

Additionally, MCU 230 may support other types of interfaces to processor 200. For example, MCU 230 may implement a dedicated graphics processor interface such as a version of the Accelerated/Advanced Graphics Port (AGP) interface, which may be used to interface processor 200 to a graphics-processing subsystem, which may include a separate graphics processor, graphics memory and/or other components. MCU 230 may also be configured to implement one or more types of peripheral interfaces, e.g., a version of the PCI-Express bus standard, through which processor 200 may interface with peripherals such as storage devices, graphics devices, networking devices, etc. In some embodiments, a secondary bus bridge (e.g., a "south bridge") external to processor 200 may be used to couple processor 200 to other peripheral devices via other types of buses or interconnects. It is noted that while memory controller and peripheral interface functions are shown integrated within processor 200 via MCU 230, in other embodiments these functions may be implemented externally to processor 200 via a conventional "north bridge" arrangement. For example, various functions of MCU 230 may be implemented via a separate chipset rather than being integrated within processor 200.

Local and Remote Microcode Units

As mentioned above, in some embodiments cores 100 may support microcoded operations. Generally speaking, microcode may encompass a processor implementation technique through which individual operations to be executed by a given core 100 are sourced from a control and data store that is separate from the usual, programmer-visible path of instruction flow, such as may be provided by, e.g., IFU 120. As an example, a given ISA such as the x86 ISA may include instructions as well as other defined processor behavior (e.g., reset functionality, interrupt/trap/exception functionality, etc.) that range significantly in complexity. A simple shift or rotate instruction involving register operands may be quite simple to implement as a single operation directly executable by an execution unit 154. A rotate instruction that rotates an operand through the carry flag, for example, may be more readily implemented as a combination of different operations executable within execution units 154. Still more complex instructions, such as certain types of complex control transfer instructions, instructions that modify system registers such as control registers, instructions involving virtual memory, instructions executing within the context of a privilege or protection model, etc. may involve additional operations, such as tests of processor state (e.g., privilege state) upon which instruction execution is conditioned.

Some instructions within an ISA may map directly to individual corresponding operations. In some embodiments, for those complex instructions in an ISA that do not directly map to a single operation executable within an execution unit 154, microcode may be used to convert a given complex instruction into a sequence of simpler operations that may be dispatched for execution. The set of operations available to microcode may generally include those operations that correspond to directly-executable ISA instructions. However, in some embodiments, microcode operations may include operations executable by execution units 154 that are not programmer visible. Additionally, microcode may be used to generate a sequence of executable operations in response to architecturally-defined processor events that do not correspond to particular instructions within the implemented ISA. For example, a reset microcode routine may include a sequence of operations configured to place a core 100 in a consistent operating state following a software or hardware reset event (e.g., by initializing caches, storing particular values to particular architectural and non-architectural registers, causing instruction fetch to begin from a predetermined address, etc.). In some embodiments, microcode may also be used to generate routines implementing non-architectural features of cores 100 (that is, features not generally visible to or accessible by programmers during normal operation of core 100). For example, microcode may be used to implement hardware test or debug routines for use during product manufacturing, field analysis, power-on self testing, or for other suitable applications.

Figure 3:
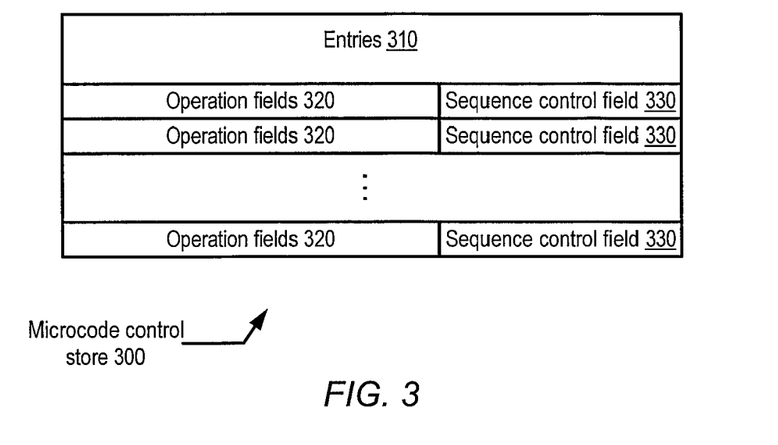
FIG. 3 is a block diagram illustrating the organization of one embodiment of a microcode control store.

Microcode routines may typically be stored within any suitable type of control store, such as a read-only memory (ROM), or, as described in greater detail below, a writeable memory such as a random access memory (RAM). One example organization of a microcode control store is illustrated in FIG. 3. In the illustrated embodiment, microcode control store 300 includes a number of entries 310, each of which may include a number of operation fields 320 as well as a sequence control field 330. In one embodiment, each of entries 310 may correspond to a respective entrypoint within a microcode address space. For example, a 12-bit microcode address space may allow for as many as 4,096 (4K) distinct entrypoint values. It is noted that in some embodiments, a microcode address space may be configured such that there exist more possible entrypoint values than actual entries 310, such as in cases where sparse entrypoint addressing is employed, for example.

In one embodiment, each operation field 320 of an entry 310 may be configured to store information encoding a single operation executable by one of execution units 154. For example, operation field 320 may include opcode bits configured to identify the type of operation to be executed as well as operand bits configured to identify the operand sources to be used by the operation, such as register or immediate data. In some embodiments, operand encodings within operation field 320 may specify that operands should be taken from a macroinstruction (e.g., a programmer-visible ISA instruction fetched by IFU 120) in response to which the microcode entry 310 is to be executed. In some embodiments, different ones of operation fields 320 may correspond to respective ones of execution units 154 within a cluster 150. Thus, for example, if execution units 154 include two ALUs and two AGUs, two of operation fields 320 may correspond to the ALUs and two may correspond to the AGUs. That is, each operation field 320 of a given entry 310 may correspond to a respective issue slot of a cluster 150, such that the entire given entry 310 may be dispatched to a cluster 150 as a unit. In some instances, one operation within a given entry 310 may have a dependence on another operation within the same entry, while in other cases each operation within an entry 310 may be independent of the others. It is noted that in other embodiments, there may be no issue slot restrictions for operation fields 320 within microcode entries 310. For example, in one such embodiment, an operation may issue from any field 320 to any execution unit.

Sequence control field 330 may be configured to govern the sequencing behavior of a microcode routine. For example, sequence control field 330 may be configured to indicate the exit point of a routine (that is, the entry 310 at which a particular routine terminates), or may indicate a nonsequential change in microcode flow control such as a conditional or unconditional branch or jump to a different entrypoint. In some embodiments, microcode sequence control may be pipelined such that the sequence control field 330 that pertains to a given entry 310 is actually associated with a different, sequentially earlier entry 310. For example, in an embodiment having a one- or two-cycle delay or bubble between fetch of a microcode entry 310 and execution of the sequence control field 330 associated with that entry 310, the sequence control field 330 that affects behavior of an entry 310 at entrypoint N may be stored in association with an entry 310 at entrypoint N−1 or N−2, respectively.

In some embodiments, instruction decode unit 140 may include functionality related to accessing and sequencing of microcode entries 310. For example, DEC 140 may be configured to detect instructions and other processor events for which microcode execution is needed and to correspondingly request entries 310 from a microcode store. In some embodiments, DEC 140 may be configured to compute an entrypoint dependent upon the instruction or other event for which microcode is needed, for example by mapping an instruction opcode to an entrypoint value within the microcode address space. DEC 140 may then submit the computed entrypoint to a microcode unit, which may be included within DEC 140 or provided as a distinct functional unit within core 100, and as a result may receive and dispatch operations indicated in one or more microcode entries 310 for execution. Microcode entrypoints may also be generated in response to events other than instruction decode. For example, entrypoints may be generated by execution clusters or other units in response to the detection of an exception or interrupt.

In embodiments of processor 200 including multiple cores 100, special concerns may exist with respect to microcode implementation. Typically, each core 100 will make reference to the same microcode content (e.g., as may be reflected within entries 310. That is, in some embodiments, each core 100 may implement the same ISA, and code may generally be expected to execute with the same functional behavior regardless of the core 100 on which it executes. Correspondingly, cores 100 could be configured to share a single, common instance of a microcode store including all of the microcode entries 310 defined for an embodiment of processor 200. However, implementing a single control store instance, such as a single ROM structure to be shared by all cores 100, may increase the distance microcode data is required to travel from the control store to core 100 that requested the data, which may increase the overall latency required to execute operations involving microcode. This, in turn, may decrease the execution performance of cores 100.

Additionally, sharing of a single control store among multiple cores 100 may result in resource contention issues if multiple cores 100 attempt to concurrently access the shared control store. Increasing the number of concurrent accesses supported by the control store (e.g., by increasing the number of read buses, the amount of entrypoint decode logic, etc.) may increase the complexity and cost of the control store and may reduce its timing performance, while serializing concurrent access requests may increase the microcode access latency experienced by cores 100, as each awaits its turn to be serviced.

By contrast, instances of a microcode control store could be replicated such that each core 100 included a complete copy of the microcode. Such replication may ameliorate the routing, latency and resource contention issues mentioned above with respect to the case of cores 100 sharing a single control store instance. For example, each replicated instance could be placed in relatively close proximity to its respective core 100, reducing overall routing distances. However, entirely replicating the control store in this fashion may increase the design area and complexity of each of cores 100, which may increase design and manufacturing cost as well as power consumption of processor 200.

Figure 4:
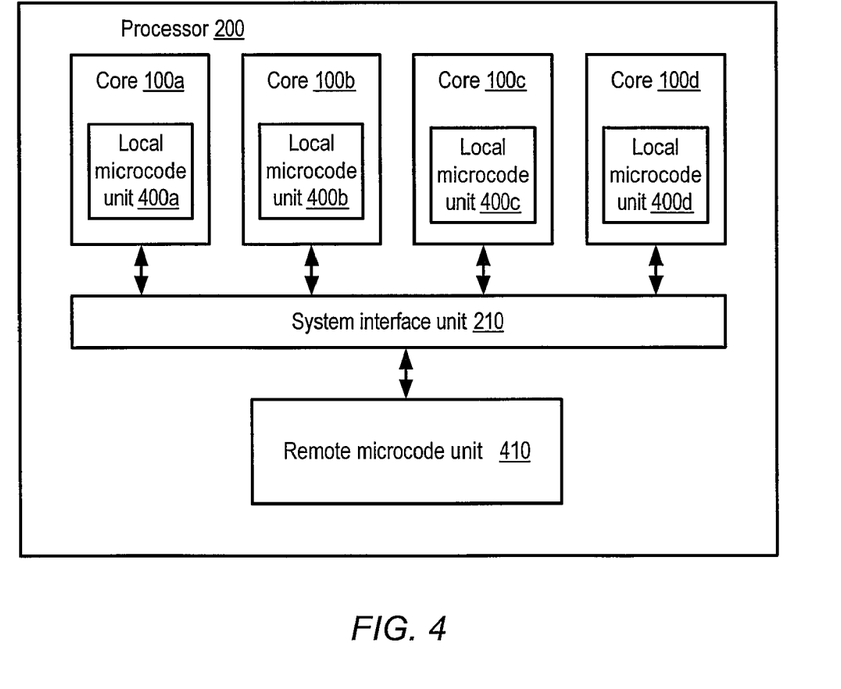
FIG. 4 is a block diagram illustrating one embodiment of a hierarchical microcode store including local and remote microcode units.

In some embodiments, processor 200 may be configured to employ a hierarchical microcode control store approach that includes aspects of both replication and sharing. As illustrated in FIG. 4, in one embodiment each of a number of cores 100*a-d* of processor 200 includes a respective instance of a local microcode unit 400*a-d* (or simply, local units 400*a-d*) and may be configured to access, via system interface unit 210, a shared remote microcode unit 410 (or simply, remote unit 410). It is noted that while they have been omitted for clarity, other elements of processor 200 shown in FIG. 2 may be included in the embodiment of FIG. 4. Further, in various embodiments the number of cores 100 and respective local microcode units 400 included therein may vary. In some embodiments, local units 400 may be included within other units of their respective cores 100. For example, local units 400 may be implemented within DEC 140. While in the illustrated embodiment, every one of cores 100 includes a respective local microcode unit 400, it is contemplated that in some embodiments only multiple ones of cores 100 may include respective local microcode units 400. That is, it is not required that every core 100 need be identically configured with respect to local units 400, although this may be the case in some embodiments.

Generally speaking, each instance of local microcode unit 400 may be configured to store microcode routines for which the operation of cores 100 is determined to be more performance sensitive, while remote microcode unit 410 may be configured to store microcode routines determined to be less performance sensitive. For example, a given microcode routine may be selected for storage within local units 400 if it satisfies a performance sensitivity threshold requirement, and otherwise may be allocated for storage within remote unit 410.

In various embodiments, the performance sensitivity of a given microcode routine may be determined using different criteria. For example, the length of microcode routines may be used as the criterion of performance sensitivity, such that routines of a given length (e.g., routines consisting of a single entry 310) or less than a threshold length are included within local units 400, while routines greater than the threshold length are included within remote unit 410. Routine execution latency may be used as a proxy for length, in some cases. Alternatively, frequency of routine execution may be used as the selection criterion, such that routines executed with at least a threshold frequency or probability (e.g., as may be predicted through simulations of expected programming workloads) are included within local units 400, while routines having lower frequencies or probabilities of execution are included within remote unit 410. In other embodiments, both execution frequency/probability and routine length may be considered, possibly with other criteria, in determining where a given routine should be stored. For example, a reset microcode routine may be quite lengthy as well as infrequently executed, and thus a likely candidate for inclusion within remote microcode unit 410. In another case, a virtual memory page miss handling microcode routine may be more frequently executed than a reset routine. However, a page miss routine may be highly likely to conduct a number of high-latency memory accesses, by virtue of the page miss. Thus, the latency of accessing the page miss routine may be overshadowed by the latency of executing the routine, making it a possible candidate for inclusion within remote microcode unit 410. Generally speaking, the threshold requirement against which the performance sensitivity of a given microcode routine may be any suitable function of one or more of the above factors (e.g., length, latency, frequency of execution) or other relevant factors.

Figure 5:
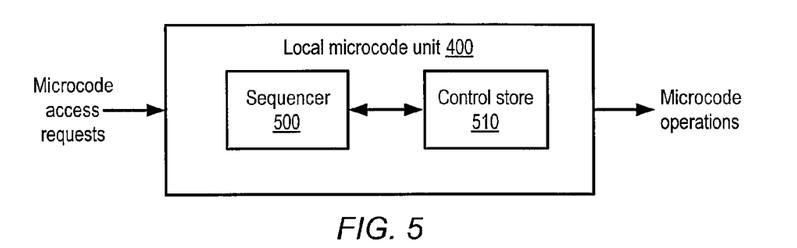
FIG. 5 is a block diagram illustrating one embodiment of a local microcode unit.

One embodiment of an instance of local microcode unit 400 is shown in FIG. 5. In the illustrated embodiment, local unit 400 includes control store 500 and sequencer 510. Generally speaking, control store 500 may be an example of an instance of microcode control store 300 configured to store a number of microcode entries 310 corresponding to those microcode routines selected for inclusion within local unit 400. In one embodiment, control store 500 may include a ROM configured according to any suitable organization. For example, control store 500 may be organized as a single large ROM bank, as multiple banks segregated according to fields of entries 310, or in another suitable fashion. Generally speaking, a ROM may refer to any type of addressable data structure configured to receive an index value (e.g., an entrypoint) as an input and to responsively provide an output value (e.g., an entry 310) corresponding to the supplied input value. Such data structures may include memory arrays as well as gate arrays or other suitable arrangements of logic devices. In some embodiments, control store 500 may include writeable memory elements such as RAM or nonvolatile memory in addition to or instead of ROM.

Sequencer 510, in one embodiment, may be configured to access control store 500 according to microcode requests received from DEC 140 and sequence control information included in entries 310. In response to receiving a particular microcode entrypoint from DEC 140, sequencer 510 may be configured to access control store 500 to retrieve an entry 310 corresponding to the particular entrypoint. Operations specified within the retrieved entry 310 may then be returned to DEC 140 for dispatch and execution. Additionally, sequencer 510 may be configured to evaluate the sequence control field 330 of the retrieved entry 310 to determine whether to retrieve another entry 310 that sequentially succeeds the previously retrieved entry 310, to retrieve another entry 310 located at a nonsequential entrypoint (e.g., at an entrypoint specified in sequence control field 330), to terminate retrieval of microcode entries 310, or to take some other defined action. In some embodiments, microcode entries 310 may include branch operations that may be predicted and/or executed within execution units 154 or elsewhere within core 100. In some such embodiments, sequencer 510 may also be configured to respond to changes in microcode sequence control arising from predicted or executed branch operations. For example, such a branch operation may cause sequencer 510 to redirect microcode retrieval from a current entrypoint to an entrypoint specified by the branch operation.

In some embodiments, each of local microcode units 400 may be configured to map the same set of microcode entrypoints to its respective control store 500, such that each of cores 100 accesses the same entrypoints as local entrypoints. While in some embodiments, each instance of control store 500 may have the same contents as each other instance within the various cores 100 of processor 200, it is contemplated that in other embodiments, each control store 500 need not be exactly identical to the others in content. For example, manufacturing flaws may result in functional differences among instances of control store 500 that may be correctable through patch techniques or through reference to entries 310 stored in locations other than a given control store 500.

Figure 6:
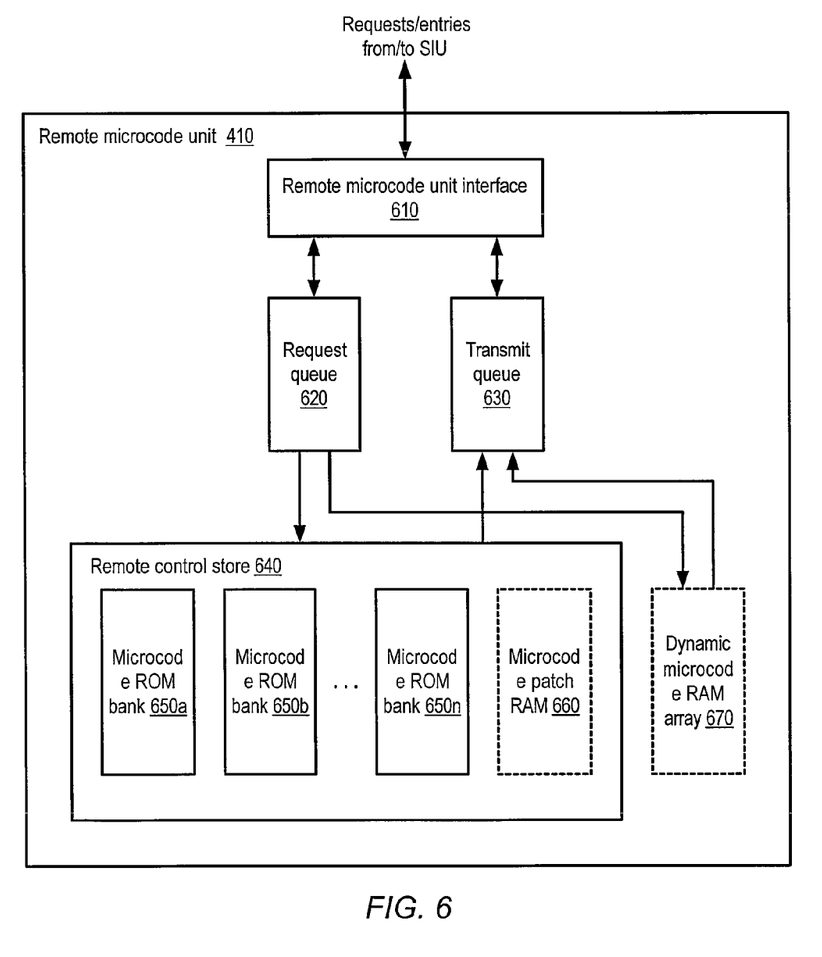
FIG. 6 is a block diagram illustrating one embodiment of a remote microcode unit.

FIG. 6 illustrates one embodiment of remote microcode unit 410. In the illustrated embodiment, remote unit 410 includes a remote microcode unit interface 610 that may be configured to communicate with cores 100 via SIU 210 or any other suitable type of interface. Interface 610 may be coupled to a request queue 620 and a transmit queue 630. Request queue 620 may be configured to convey to a remote control store 640 requests for microcode entries stored within the control store. In the illustrated embodiment, remote control store 640 may include an arbitrary number of microcode ROM banks 650$a$-$n$, and optionally may include a microcode patch RAM 660. In some embodiments, request queue 620 may also be configured to convey microcode requests to an optional dynamic microcode RAM array 670. Transmit queue 630 may be configured to queue entries retrieved from remote control store 640 and, in some embodiments, dynamic microcode RAM array 670 for transmission to their requesting cores 100.

As described above with respect to FIG. 4, remote unit 410 may be configured to store various microcode routines on behalf of cores 100. Such routines may include, for example, routines that are lengthy, infrequently executed or otherwise deemed to be less likely to affect processor performance than routines selected for inclusion within local units 400. Generally speaking, remote unit 410 may be configured to receive requests for various microcode entrypoints from different ones of cores 100, and may respond to each request with one or more corresponding entries. Depending on the configuration of remote microcode unit interface 610 and the interface protocols employed between cores 100 and remote unit 410, microcode requests from multiple cores 100 may be received concurrently or serially.

Remote control store 640 may be an exemplary instance of microcode control store 300 configured to store a number of microcode entries 310 corresponding to the microcode routines selected for inclusion within remote unit 410. In some embodiments, the format of an entry 310 stored within remote control store 640 may be similar to that of an entry 310 stored within control store 500 of local unit 400. In the illustrated embodiment, entries 310 may be distributed across a number of microcode ROM banks 650 according to any suitable partitioning or organization. It is noted that in other embodiments, the number of banks 650 may vary. It is also contemplated that, as with control store 500, in some embodiments remote control store 640 may include writeable memory and/or data storage elements other than memory arrays.

Generally, remote microcode unit interface 610, request queue 620 and transmit queue 630 may be collectively configured to manage the processing of microcode requests received from cores 100. Request queue 620 may be configured to store incoming microcode requests, which in one embodiment may minimally include an entrypoint and an indication of the requesting core 100, until they can be processed within remote control store 640. Similarly, transmit queue 630 may be configured to store entries 310 that have been retrieved from remote control store 640, or in some embodiments from dynamic microcode RAM array 670, until the entries 310 can be transmitted to their requesting cores 100. In one embodiment, remote microcode unit interface 610 may be configured to control the receipt of requests from cores 100 and the transmission of resulting entries to cores 100, including the management of request queue 620 and transmit queue 630. Interface 610 may also include logic configured to coordinate the processing of individual requests stored in request queue 620, for example to select particular requests for processing according to sequencing control or an arbitration scheme, and to coordinate the storage within transmit queue 630 of entries retrieved during request processing. In other embodiments, the selection of requests for processing from request queue 620 and storage of results within transmit queue 630 may be performed by logic external to interface 610.

A number of different request management configurations of remote unit 410 are possible and contemplated. In one embodiment, remote unit 410 may omit sequencing functionality. In such an embodiment, remote microcode unit interface 610 may be configured to receive requests from a given core 100 that correspond to each specific entrypoint the given core 100 wishes to receive. Thus, for example, sequencer 510 of a given local unit 400 may be configured to determine what entrypoints need to be retrieved for a given routine stored within remote unit 410 and to generate requests directed to those entrypoints in a manner similar to that used to access control store 500.

While omitting sequencing functionality from remote unit 410 may simplify its design, it may increase request traffic and processing latency between cores 100 and remote unit 410. In other embodiments, remote unit 410 may support varying degrees of autonomous sequencing. For example, in one embodiment, a received microcode request may specify a starting entrypoint and an ending entrypoint or a number of entries to be retrieved. In such an embodiment, remote unit 410 may be configured to retrieve multiple entries 310 corresponding to the received request, beginning with the starting endpoint and continuing sequentially until the ending entrypoint or number of entries to retrieve has been reached. The multiple entries 310 thus retrieved may be returned to the requesting core 100 in the order they were retrieved.

In another embodiment, remote unit 410 may support more sophisticated sequencing functionality. For example, remote unit 410 may be configured to include a sequencer similar in functionality to sequencer 510. Such a sequencer may be configured to support some or all values of sequence control field 330 supported by sequencer 510. Alternatively, in one embodiment entries 310 stored within remote unit 410 may be configured to include an additional sequence control field distinct from sequence control field 330, such that the additional sequence control field may be processed by sequencing functionality within remote unit 410, while sequence control field 330 may be processed by a sequencer 510 within a particular local unit 400. In such an embodiment, the task of sequencing multiple-entry routines may be divided among remote unit 410 and local unit 400 as appropriate.

Since remote unit 410 may be shared by a number of different cores 100, remote unit 410 may be configured to employ various different types of arbitration or scheduling policies when selecting which microcode requests to service. For example, remote unit 410 may be configured to select requests from request queue 620 for processing in a round-robin fashion, by selecting the oldest request first, or by using any other suitable selection scheme. In some embodiments where remote unit 410 supports sequencing of requests, it is possible that a single request from a particular core 100 may cause a considerable number of entries 310 to be retrieved, to the possible exclusion of requests from other cores 100. Correspondingly, in some embodiments such a request may be paused after a certain number of entries 310 have been retrieved to allow a different request to be serviced. Alternatively, a fairness algorithm for selecting a next request to be serviced may account not just for the total number of requests recently serviced on behalf of cores 100, but the durations of those requests. It is noted that in some embodiments, remote control store 640 may be configured in a multiported fashion, such that more than one microcode request may be concurrently retrieved. For example, remote control store 640 may be implemented using multiported memory cells. Alternatively, smaller single-ported memory cells may be employed in a banked scheme such that multiple requests targeting different banks 650 may be concurrently retrieved. In some banked embodiments, multiple requests that target the same bank 650 may be serialized.

Dividing microcode implementation hierarchically into multiple local microcode units 400 and a shared remote microcode unit 410 may facilitate improvements to timing and power consumption of processor 200. For example, local microcode units 400 may typically be smaller in area than remote microcode unit 410, which may allow local microcode units 400 to operate at a higher frequency than if each local microcode unit 400 were as large as remote microcode unit 410. Similarly, smaller microcode units may typically consume less power than larger ones. In some embodiments, implementing remote microcode unit 410 separately from local microcode units 400 may enable remote microcode unit 410 to be powered down when not being accessed by a core 100 (e.g., by gating clocks or disabling the power grid to remote unit 410). This may reduce the overall power consumption of processor 200.

Figure 7:
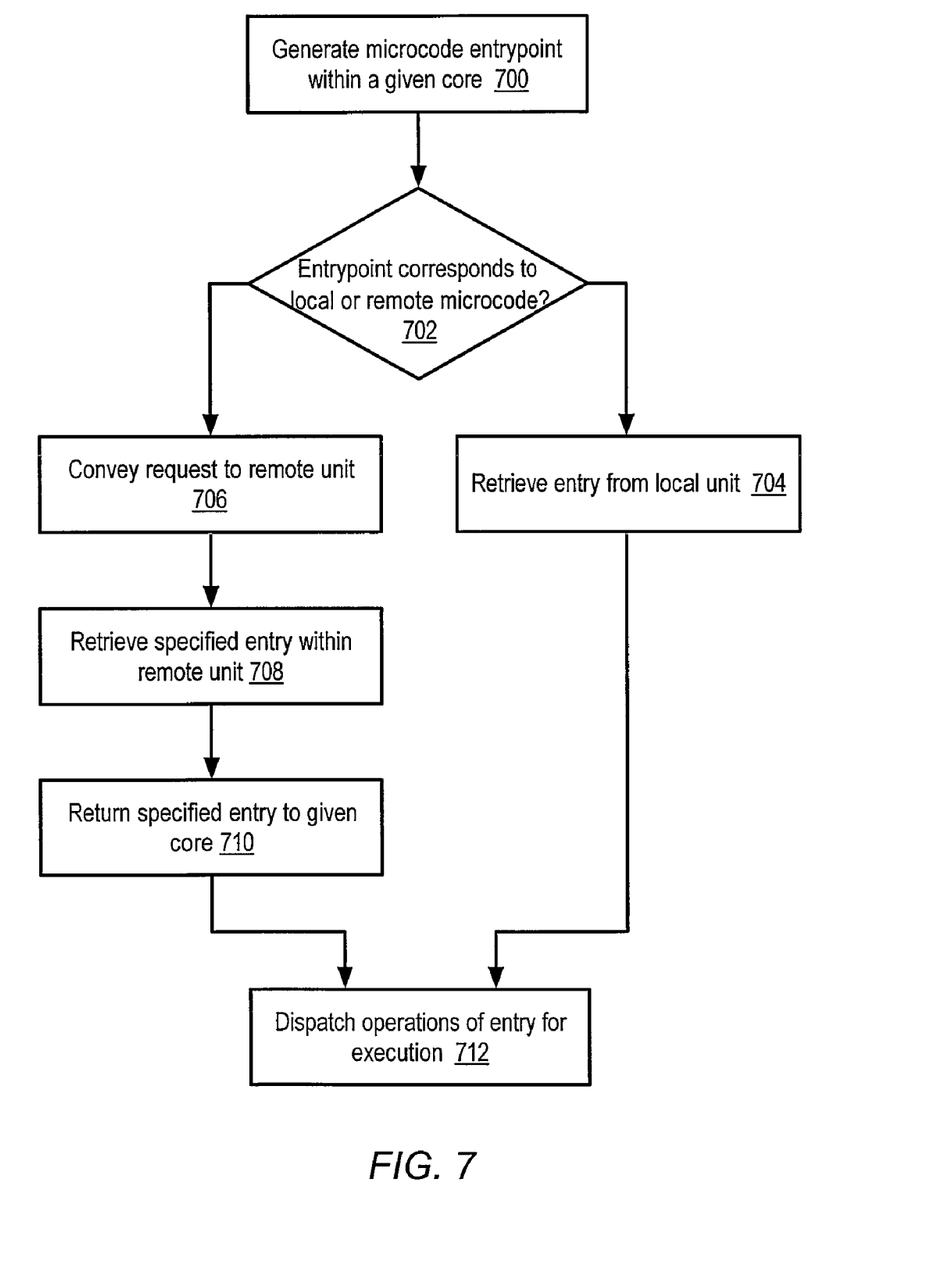
FIG. 7 is a flow diagram illustrating one embodiment of a method of retrieving microcode entries in a processor having a hierarchical microcode store.

One embodiment of a method of retrieving microcode entries 310 in a processor embodiment including local microcode units 400 within individual cores 100 and a shared remote microcode unit 410 is illustrated in FIG. 7. In the illustrated embodiment, operation begins in block 700 where a microcode entrypoint is generated within a given core 100. In one embodiment, DEC 140 may be configured to generate a microcode entrypoint corresponding to an instruction received from IFU 120, for example by decoding various portions of the instruction, determining that the instruction corresponds to microcode, and generating the corresponding entrypoint from the decoded instruction. As mentioned above, in some embodiments entrypoints may also be generated, by DEC 140 or another unit within core 100, for processor events other than instruction execution, such as reset events, interrupts, traps, exceptions, faults, requests to invoke nonarchitectural microcode routines (e.g., test or debug routines), or other types of events involving microcode execution.

It is then determined whether the generated entrypoint corresponds to an entry 310 located in a local microcode unit 400 within given core 100, or located within remote microcode unit 410 (block 702). In one embodiment, the microcode address space that encompasses entries 310 may be divided such that one or more address space portions correspond to entries 310 within local microcode unit 400, while one or more other, distinct address space portions correspond to entries 310 within remote microcode unit 410. For example, one embodiment may support a 12-bit microcode address space encompassing 4,096 entries 310, of which 1,024 may be located within local microcode unit 400 while the remainder may be stored remotely. In this example, hexadecimal entrypoint values 0x000 through 0x3FF may correspond to entries 310 within local unit 400, while entrypoint values 0x400 through 0xFFF may correspond to entries within remote unit 410. Other mappings are possible, such as mappings in which multiple discontiguous portions of the microcode address space are allocated to the various units. Also, in some embodiments the determination of whether an entrypoint is local or remote may depend on an indication other than whether the entrypoint falls in a particular address range. For example, a local/remote indication may be decoded from an instruction by DEC 140 separately from an entrypoint for that instruction. In various embodiments, the determination of whether an entrypoint is local or remote may be performed by decode logic within core 100, such as DEC 140, by the local microcode unit 400, such as sequencer 510, or by other logic within core 100.

If the generated entrypoint corresponds to an entry 310 located within local unit 400, the entry is retrieved from the local unit (block 704). For example, upon receiving the entrypoint along with an indication of a microcode request, sequencer 510 within local unit 400 may be configured to access control store 500 to retrieve the corresponding entry 310.

If the generated entrypoint corresponds to an entry 310 located within remote unit 410, a request may be conveyed to the remote unit (block 706). For example, either DEC 140 or local unit 400 may initiate a request to remote unit 410 by conveying the request via system interface unit 210 specifying remote unit 410 as a destination. Remote unit 410 may then retrieve the specified entry 310 (block 708) and return the entry to the given core 100 (block 710). For example, remote microcode unit interface 610 may receive the request from SIU 210 and insert it within request queue 620. When selected, the request may be processed to retrieve the specified entry 310 from remote control store 640, and the results may be placed within transmit queue 630. Subsequently, interface 610 may select the entry 310 from transmit queue 630 and convey it to given core 100 via SIU 210.

Once the entry 310 has been retrieved from either local unit 400 or remote unit 410, its operations may be dispatched for execution (block 712). For example, DEC 140 may dispatch operations as specified within entry 310 to a scheduler 152 within one of clusters 150 for subsequent execution by execution units 154. In some embodiments, further decoding of the operations specified within the entry 310 may be performed prior to dispatch, for example by DEC 140.

In some embodiments, operations specified by a retrieved microcode entry 310 may be stored or queued prior to being dispatched for execution. For example, DEC 140 may implement queues that allow the dispatching of operations to be decoupled from the decode or microcode retrieval process, which may reduce the performance impacts of stalls that may occur in or upstream from DEC 140. In some embodiments, operations specified in a microcode entry 310 that is retrieved from remote microcode unit 410 may be inserted directly into such operation queues or storage upon receipt by core 100, and the retrieved entry 310 may not otherwise be stored or retained within core 100. However, in other embodiments, a retrieved remotely-stored entry 310 may be held within core 100 for some time, which may enable the entry 310 to be reused without waiting for it to be retrieved once again from remote unit 410. For example, local microcode unit 400 may include writable storage into which an entry 310 retrieved from remote unit 410 may be written upon receipt. In one embodiment, such storage may include one or several buffers or registers, and the entry 310 may be stored until evicted by a subsequently retrieved entry 310.

In another embodiment, local unit 400 may include a microcode cache, for example implemented as part of control store 500. Such a cache may be configured to store a number of retrieved entries 310 and may be organized using any suitable configuration, such as direct mapped, set associative, fully associative, etc. Cache evictions may be performed according to any suitable replacement policy, such as a least frequently or least recently used policy. In one variation of such an embodiment, retrieved entries 310 may be stored within instruction cache 110 rather than within a dedicated microcode cache. In embodiments where remotely-stored retrieved entries 310 may be cached or otherwise stored within core 100, the cache or other local storage may be checked for the presence of a given remotely-stored entry 310 either prior to or concurrently with the generation of a request for the given entry 310. If the desired entry 310 is already available within a local cache or other local storage, the request to remote unit 410 may not be generated or may be canceled if already outstanding. The microcode cache may be configured to provide a dynamic microcode store that is local to the core 100 and allocated based on the particular instruction streams executing on a given core 100. Since the latency to remote microcode unit 410 may typically be greater than to a given local microcode unit 400, the microcode cache may mitigate performance issues with infrequent instruction sequences that, when they occur, may require frequent access to remote microcode unit 410.

It is noted that while in embodiments like the one of FIG. 4, a single remote microcode unit 410 may be shared by a number of cores 100, in other embodiments remote microcode unit 410 may be replicated. For example, several instances of remote microcode unit 410 may be shared by fewer than all of cores 100. Alternatively, a complete replica of remote microcode unit 410 may be included within each of cores 100. In such embodiments, the increased area required by replicas of remote microcode unit 410 may be offset by decreased routing and/or timing complexity. For example, replication of remote microcode unit 410 may reduce the average distance from cores 100 to remote microcode, reducing remote microcode access latency accordingly.

In many processor implementations, microcode is often static during processor implementation and may be implemented within a read-only control store, for example to minimize the area required by the control store. However, it may be useful in some embodiments to provide a technique whereby microcode may be modified, for example in order to correct defects or add functionality. As shown in FIG. 6, in some embodiments remote microcode unit 410 may include additional features configured to provide a writeable control store.

Optional microcode patch RAM 660 may be configured to provide a facility through which specific entrypoints may be mapped from microcode ROM banks 650 to corresponding writeable entries 310 within patch RAM 660. In one embodiment, patch RAM 660 may include writeable storage resources configured to implement a number of entries 310. In some embodiments, patch RAM 660 may include the same number of entries 310 as one of ROM banks 650, though in other embodiments more or fewer entries may be provided. Patch RAM 660 may also provide resources for each entry 310 to correspond to an assignable entrypoint. In embodiments where remote control store 640 includes a number of ROM banks 650 each having the same number of entries as patch RAM 660, a given entry 310 in patch RAM 660 may map to a corresponding entry 310 in any one of ROM banks 650. An additional set of bits within patch RAM 660 may specify which bank a given patch RAM entry corresponds to at any given time. For example, an embodiment may include four ROM banks 650 and one patch RAM bank 660, each with 1000 entries. Additional bits within patch RAM 660 may specify, for each given entry 310 therein, which if any of the four ROM banks the given entry is mapped to. In other embodiments, each entry of patch RAM 660 may have a programmable corresponding entrypoint.

To patch a given entry 310 within one of banks 650, in one embodiment the desired patched value for the given entry may be stored within a corresponding entry of patch RAM 660 along with either information indicating which bank 650 is to be patched, or a specific entrypoint value to be associated with the patch RAM entry. Subsequently, when a request to access a particular entrypoint is received by remote control store 640, patch RAM 660 may be examined to determine whether the requested entrypoint has been patched. For example, remote control store 640 may be configured to determine the particular bank 650 to which the particular entrypoint maps, and then examine control bits for a corresponding entry 310 within patch RAM 660 to determine whether the entry 310 stored within patch RAM 660 should be selected instead of the entry 310 stored within the particular bank 650. Alternatively, the particular entrypoint may be compared against programmed entrypoints within patch RAM 660 in an associative fashion to determine whether the particular entrypoint hits or matches an entry of patch RAM 660. It is noted that while patch RAM 660 has been shown as an optional feature of remote microcode unit 410, in some embodiments local microcode unit 400 may also support patch RAM features within control store 500 in a manner similar to that just described.

Patch RAM 660 may readily provide for patching of individual microcode entrypoints. However, in some embodiments, it may be desirable to rewrite entire routines encompassing many entrypoints, or to augment existing microcode with new routines. Correspondingly, in one embodiment remote microcode unit 410 may include optional dynamic microcode RAM array 670. Generally speaking, microcode RAM array 670 may be implemented according to any suitable writable or nonvolatile storage array technology and may be configured to store a number of entries 310 in addition to those stored within remote control store 640 and local control store 500. In one embodiment, the portion(s) of the microcode address space associated with entries 310 of microcode RAM array 670 may be distinct from those portions of the microcode address space associated with entries 310 within remote control store 640 and local control store 500, such that a microcode access request received by remote microcode unit 410 may be steered to either remote control store 640 or microcode RAM array 670 according to the requested entrypoint.

In other embodiments, certain entries 310 within microcode RAM array 670 may be configured to shadow or override entrypoints that also map to remote control store 640. For example, microcode RAM array 670 may include programmable entrypoint control bits or registers similar to those described above with respect to patch RAM 660. In such embodiments, a particular entrypoint that maps to remote microcode unit 410 may be checked to see if a corresponding entry 310 has been defined within microcode RAM array 670. If so, any corresponding entry 310 within remote control store 640 may be disregarded. In some embodiments of remote microcode unit 410 that support some degree of sequencing, once an entrypoint has initially been mapped to microcode RAM array 670, e.g., at the beginning of a multiple-entry microcode routine, subsequent sequential references may remain within a portion of the microcode address space allocated to microcode RAM array 670. This may allow the remainder of the routine to execute from RAM array 670 without further reference to remote control store 640.

It is noted that while the above embodiments have been described with respect to a two-level hierarchy including local microcode units 400 and a remote microcode unit 410, in other embodiments, microcode may be distributed within processor 200, or across multiple instances of processor 200 within a system, using additional levels of hierarchy.

Figure 8:
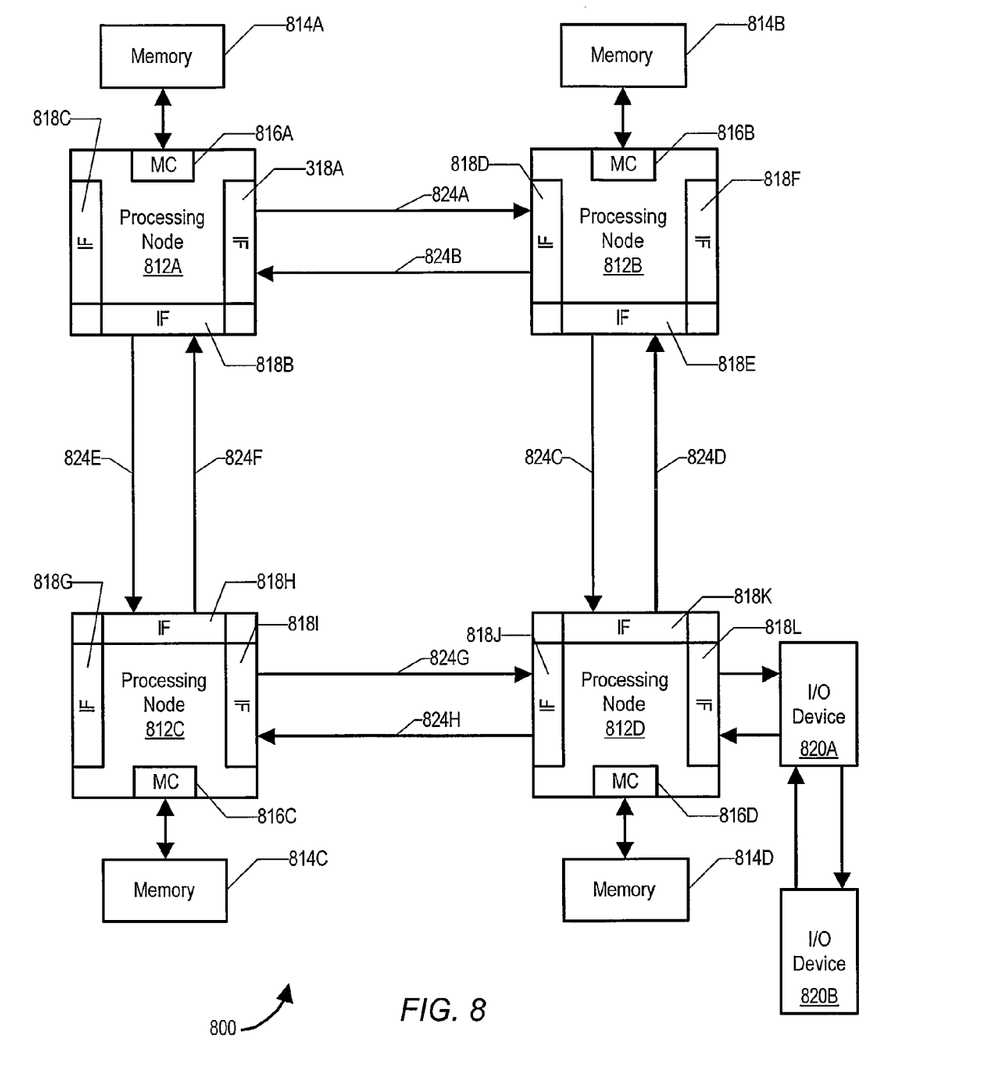
FIG. 8 is a block diagram illustrating one embodiment of an exemplary computer system.

In some embodiments, processor 200 may be implemented within a computer system along with other components. One embodiment of such a system is shown in FIG. 8. In the illustrated embodiment, computer system 800 includes several processing nodes 812A, 812B, 812C, and 812D. Each processing node is coupled to a respective memory 814A-814D via a memory controller 816A-816D included within each respective processing node 812A-812D. Additionally, processing nodes 812A-812D include interface logic used to communicate between the processing nodes 812A-812D. For example, processing node 812A includes interface logic 818A for communicating with processing node 812B, interface logic 818B for communicating with processing node 812C, and a third interface logic 818C for communicating with yet another processing node (not shown). Similarly, processing node 812B includes interface logic 818D, 818E, and 818F; processing node 812C includes interface logic 818G, 818H, and 818I; and processing node 812D includes interface logic 818J, 818K, and 818L. Processing node 812D is coupled to communicate with a plurality of input/output devices (e.g. devices 820A-820B in a daisy chain configuration) via interface logic 818L. Other processing nodes may communicate with other I/O devices in a similar fashion.

Processing nodes 812A-812D may be configured to implement a packet-based link for inter-processing node communication. In the illustrated embodiment, the link is implemented as sets of unidirectional lines (e.g. lines 824A are used to transmit packets from processing node 812A to processing node 812B and lines 824B are used to transmit packets from processing node 812B to processing node 812A). Other sets of lines 824C-824H are used to transmit packets between other processing nodes as illustrated in FIG. 8. Generally, each set of lines 824 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 812A to processing node 812D may pass through either processing node 812B or processing node 812C as shown in FIG. 8. Any suitable routing algorithm may be used. Other embodiments of computer system 800 may include more or fewer processing nodes then the embodiment shown in FIG. 8. Also, other embodiments of computer system 800 may be implemented using bidirectional buses employing suitable interface protocols rather than unidirectional buses employing packet-based protocols as described above.

Generally, the packets may be transmitted as one or more bit times on the lines 824 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 812A-812D, in addition to a memory controller and interface logic, may include one or more processors. Broadly speaking, a processing node comprises at least one processor and may optionally include a memory controller for communicating with a memory and other logic as desired. More particularly, each processing node 812A-812D may comprise one or more copies of processor 200 as shown in FIG. 2 (e.g., including various structural and operational details shown in FIGS. 1 and 3-7). One or more processors may comprise a chip multiprocessing (CMP) or chip multithreaded (CMT) integrated circuit in the processing node or forming the processing node, or the processing node may have any other desired internal structure. In some embodiments, memory controller and/or peripheral interface logic of a processing node 812 may be integrated directly within processor 200, as shown in FIG. 2. For example, an instance of memory controller 816 may correspond to memory controller/peripheral interface 230 within processor 200.

Memories 814A-814D may comprise any suitable memory devices. For example, a memory 814A-814D may comprise one or more RAMBUS DRAMs (RDRAMs), synchronous DRAMs (SDRAMs), DDR SDRAM, static RAM, etc. The address space of computer system 800 may be divided among memories 814A-814D. Each processing node 812A-812D may include a memory map used to determine which addresses are mapped to which memories 814A-814D, and hence to which processing node 812A-812D a memory request for a particular address should be routed. In one embodiment, the coherency point for an address within computer system 800 is the memory controller 816A-816D coupled to the memory storing bytes corresponding to the address. In other words, the memory controller 816A-816D may be responsible for ensuring that each memory access to the corresponding memory 814A-814D occurs in a cache coherent fashion. Memory controllers 816A-816D may comprise control circuitry for interfacing to memories 814A-814D. Additionally, memory controllers 816A-816D may include request queues for queuing memory requests.

Generally, interface logic 818A-818L may comprise a variety of buffers for receiving packets from the link and for buffering packets to be transmitted upon the link. As noted above, in some embodiments interface logic 818 may be integrated within processor 200, for example within memory controller/peripheral interface 230 or within a separate interface distinct from an integrated memory controller. Computer system 800 may employ any suitable flow control mechanism for transmitting packets. For example, in one embodiment, each interface logic 818 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 820A-820B may be any suitable I/O devices. For example, I/O devices 820A-820B may include devices for communicating with another computer system to which the devices may be coupled (e.g. wired or wireless network interface cards or modems). Furthermore, I/O devices 820A-820B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 800, within processor 200 and/or in software executed on a processing node. It is noted that the term "I/O device" and the term "peripheral device" are intended to be synonymous herein.

Furthermore, one or more processors 200 may be implemented in a more traditional personal computer (PC) structure including one or more interfaces of the processors to a bridge to one or more I/O interconnects and/or memory. For example, processor 200 may be configured for implementation within a north bridge-south bridge hierarchy. In such an embodiment, the north bridge (which may be coupled to or integrated within processor 200) may be configured to provide high-bandwidth connectivity to system memory, graphics device interfaces and/or other system devices, while the south bridge may provide lower-bandwidth connectivity to other peripherals via various types of peripheral buses (e.g., Universal Serial Bus (USB), PCI, ISA, etc.).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   a plurality of processor cores, each configured to independently execute instructions defined according to a programmer-visible instruction set architecture (ISA), wherein each of said plurality of processor cores includes a respective local microcode unit configured to store microcode entries; and
   a remote microcode unit accessible by each of said processor cores and including a remote microcode store configured to store microcode entries;
   wherein said respective local microcode units and said remote microcode unit are configured such that a given microcode entry that is stored within said respective local microcode units is not also stored within said remote microcode unit;
   wherein any given one of said processor cores is further configured to:
      generate a given microcode entrypoint corresponding to a particular microcode entry including one or more operations to be executed by said given processor core;
      determine whether said particular microcode entry is stored within said respective local microcode unit of said given processor core; and
      in response to determining that said particular microcode entry is not stored within said respective local microcode unit, convey a request for said particular microcode entry to said remote microcode unit.

2. The processor as recited in claim 1, wherein to determine whether said particular microcode entry is stored within said respective local microcode unit of said given processor core, said given processor core is further configured to determine whether said given microcode entrypoint is located in a portion of a microcode entrypoint address space corresponding to said respective local microcode unit.

3. The processor as recited in claim 1, wherein in response to receiving said request, said remote microcode unit is further configured to retrieve said particular microcode entry from said remote microcode store and to return said particular microcode entry to said given processor core.

4. The processor as recited in claim 3, wherein said particular microcode entry includes a sequence control field configured to indicate whether another microcode entry is to be retrieved subsequent to said particular microcode entry, and wherein said remote microcode unit is further configured, dependent on said sequence control field, to retrieve said another microcode entry from said remote microcode store and to return said another microcode entry to said given processor core without said given processor core separately requesting said another microcode entry.

5. The processor as recited in claim 1, wherein said given processor core is further configured to generate said given microcode entrypoint in response to decoding a given one of said instructions and determining that said given instruction is a microcoded instruction.

6. The processor as recited in claim 1, wherein said given processor core is further configured to generate said given microcode entrypoint in response to detecting an architecturally-defined processor event corresponding to a microcode routine.

7. The processor as recited in claim 1, wherein each of said processor cores further includes a respective instruction cache configured to store one or more of said instructions, wherein in response to receiving said particular microcode entry subsequent to said request, said given processor core is further configured to store said particular microcode entry within said respective instruction cache.

8. The processor as recited in claim 1, wherein each of said respective local microcode units is associated with a corresponding read-only memory that is distinct from said remote microcode unit, and wherein microcode entries stored within a given one of said respective local microcode units are stored within the read-only memory corresponding to the given respective local microcode unit.

9. The processor as recited in claim 1, wherein microcode routines corresponding to microcode entries stored within said local microcode units each satisfy a performance sensitivity threshold requirement, while at least some microcode routines corresponding to microcode entries stored within said remote microcode unit each do not satisfy said performance sensitivity threshold requirement.

10. The processor as recited in claim 9, wherein said performance sensitivity threshold requirement is dependent upon a frequency of microcode routine execution.

11. The processor as recited in claim 9, wherein said performance sensitivity threshold requirement is dependent upon a latency of microcode routine execution.

12. A method, comprising:
   a given one of a plurality of processor cores generating a given microcode entrypoint corresponding to a particular microcode entry including one or more operations to be executed by said given processor core, wherein each of said plurality of processor cores is configured to independently execute instructions defined according to a programmer-visible instruction set architecture (ISA), and wherein each of said plurality of processor cores includes a respective local microcode unit configured to store microcode entries;
   said given processor core determining whether said particular microcode entry is stored within said respective local microcode unit of said given processor core; and
   in response to determining that said particular microcode entry is not stored within said respective local microcode unit, said given processor core conveying a request for said particular microcode entry to a remote microcode unit, wherein said remote microcode unit is accessible by each of said plurality of processor cores and includes a remote microcode store configured to store microcode entries;
   wherein said respective local microcode units and said remote microcode unit are configured such that a given microcode entry that is stored within said respective local microcode units is not also stored within said remote microcode unit.

13. The method as recited in claim 12, wherein said given processor core determining whether said particular microcode entry is stored within said respective local microcode unit of said given processor core comprises said given processor core determining whether said given microcode entrypoint is located in a portion of a microcode entrypoint address space corresponding to said respective local microcode unit.

14. The method as recited in claim 12, further comprising:
in response to receiving said request, said remote microcode unit retrieving said particular microcode entry from said remote microcode store and returning said particular microcode entry to said given processor core.

15. The method as recited in claim 14, wherein said particular microcode entry includes a sequence control field configured to indicate whether another microcode entry is to be retrieved subsequent to said particular microcode entry, and wherein the method further comprises said remote microcode unit retrieving, dependent on said sequence control field, said another microcode entry from said remote microcode store and returning said another microcode entry to said given processor core without said given processor core separately requesting said another microcode entry.

16. The method as recited in claim 12, further comprising said given processor core generating said given microcode entrypoint in response to decoding a given one of said instructions and determining that said given instruction is a microcoded instruction.

17. The method as recited in claim 12, further comprising said given processor core generating said given microcode entrypoint in response to detecting an architecturally-defined processor event corresponding to a microcode routine.

18. The method as recited in claim 12, wherein each of said processor cores further includes a respective instruction cache configured to store ones of said instructions, and wherein the method further comprises said given processor core storing said particular microcode entry within said respective instruction cache in response to receiving said particular microcode entry subsequent to said request.

19. The method as recited in claim 12, wherein at least a portion of said remote microcode store includes writeable memory.

20. A system, comprising:
a system memory; and
a processor coupled to said system memory, wherein said processor comprises:
  a plurality of processor cores, each configured to independently execute instructions defined according to a programmer-visible instruction set architecture (ISA), wherein each of said plurality of processor cores includes a respective local microcode unit configured to store microcode entries; and
  a remote microcode unit accessible by each of said processor cores and including a remote microcode store configured to store microcode entries;
wherein said respective local microcode units and said remote microcode unit are configured such that a given microcode entry that is stored within said respective local microcode units is not also stored within said remote microcode unit;
wherein any given one of said processor cores is further configured to:
  generate a given microcode entrypoint corresponding to a particular microcode entry including one or more operations to be executed by said given processor core;
  determine whether said particular microcode entry is stored within said respective local microcode unit of said given processor core; and
  in response to determining that said particular microcode entry is not stored within said respective local microcode unit, convey a request for said particular microcode entry to said remote microcode unit.

* * * * *